United States Patent Office 3,167,132
Patented Jan. 26, 1965

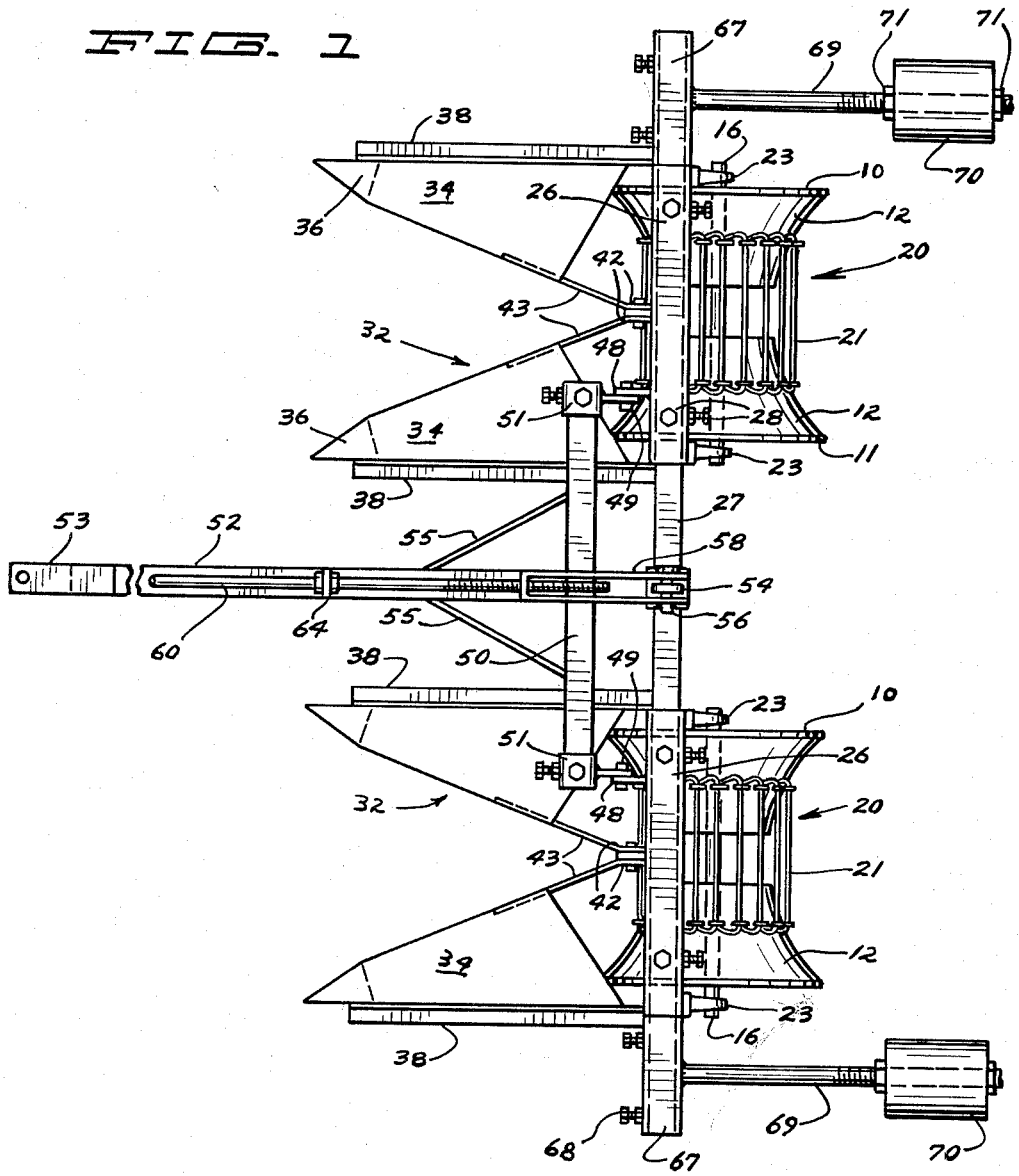

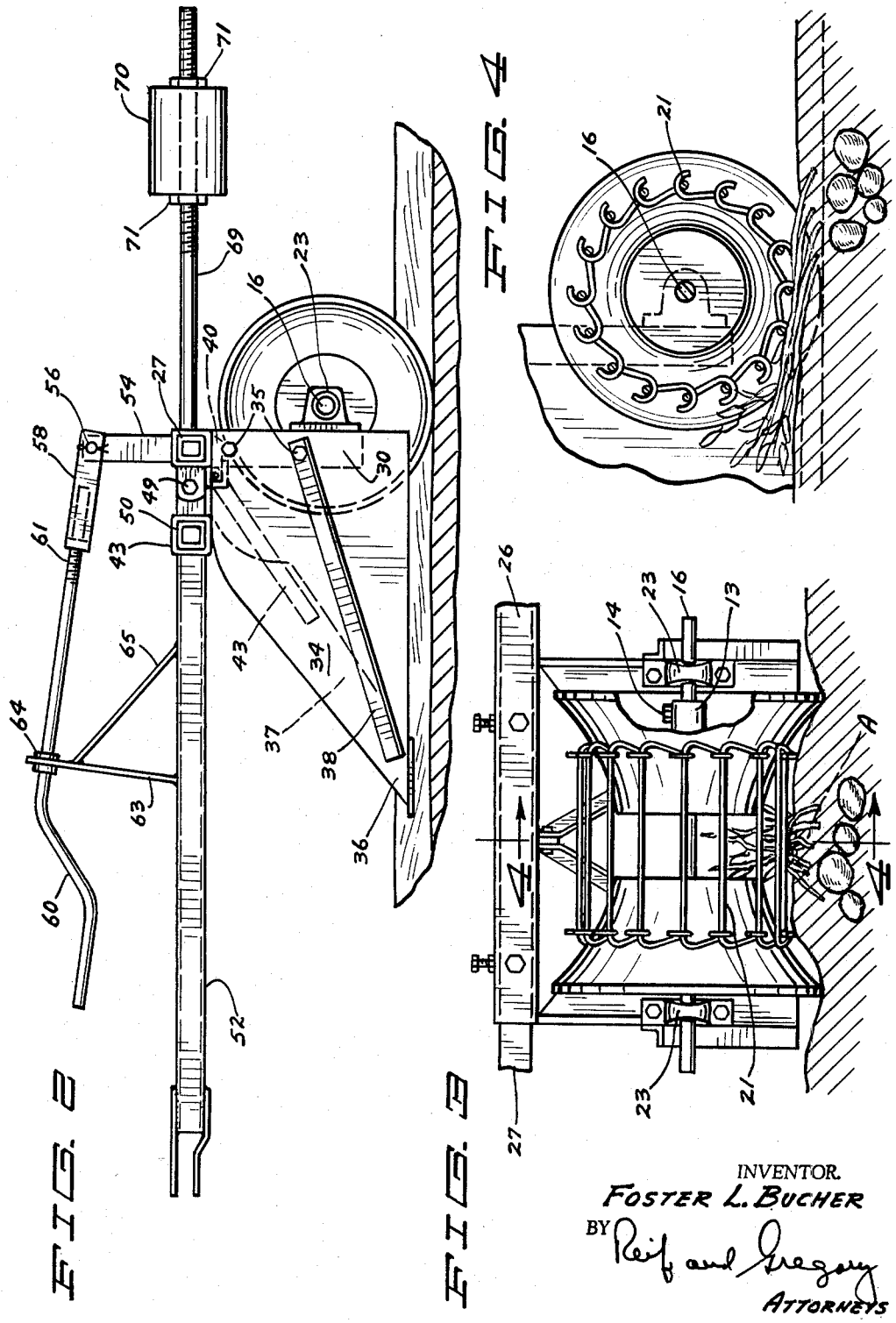

3,167,132
VINE PULLING APPARATUS
Foster L. Bucher, Cambridge, Minn., assignor to Dahlman Manufacturing & Sales, Inc., Braham, Minn., a corporation of Minnesota
Filed Feb. 8, 1962, Ser. No. 171,974
1 Claim. (Cl. 171—27)

This invention relates to a device usable as a windrower, vine puller and a clod crusher in connection with root crops. More specifically, reference will be had to the invention herein as a potato vine puller.

In connection with raising potatoes, it is desirable to have uniform maturity of plants in a given field, and more particularly a predetermined maturity date is very desirable. It is not uncommon to beat, burn or spray potato vines in an effort to cut off the feeding system from the potato. When the feeding system is cut off from the potato, the potato skin becomes set and the potato ripens.

In addition to the vines above ground, there is an underground root system in connection with the vines which has direct contact with the potato. Destroying the vines above the surface of the ground tends to negative the effect of the underground feeding system and causes the potato to mature sooner than otherwise. It is desirable to have some way of physically breaking the root system free from the potato so that the potato will begin to mature instantly. The vine and roots of a potato are connected to it by stolons and the roots in turn have a large number of feeders. When the stolons are broken free from the potato, the feeding of the potato will stop immediately and the potato will begin to mature. A jerk on the vine of a potato to the extent on the order of one-half an inch is sufficient to break the stolons free from the potato. The length of time required for the maturity of a potato from the time the root system is broken free therefrom is pretty well known. Hence the maturity date and the digging date for the potato can be readily and accurately predetermined.

Thus it is an object of this invention to provide a device to break away from the potato its feeding or root system.

It is another object of this invention to provide a device to readily engage potato vines in such a manner as to subject the vines to a sudden sharp jerk, and such a jerk is sufficient to break the underground feeding system free from the potato in order to commence the potato's maturity as of that time.

It is another object of this invention to provide a device to be drawn over rows of potatoes straddling the same and having a portion thereof which in effect is dragged over the potato hill to frictionally engage the potato vines thereon a sufficient length of time to sharply jerk the same.

More specifically it is an object of this invention to provide a device having spaced rollers and disposed therebetween a member spaced from the surface of the ground such a distance as to permit it to engage potato hills in being substantially dragged over the same to frictionally engage the potato vines thereon and jerk the same sufficiently to break the root system free from the potato.

These and other objects and advantages of the invention will be fully set forth in the following description made in connection with the accompanying drawings in which like reference characters refer to similar parts throughout the several views and in which:

FIG. 1 is a top plan view of applicant's device;

FIG. 2 is a view of applicant's device in end elevation, with some portions thereof shown in dotted line;

FIG. 3 is a fragmentary view of applicant's device in front elevation in operating position; and FIG. 4 is a fragmentary view taken on line 4—4 of FIG. 3 in the direction of the arrows.

With reference to FIG. 1, a pair of applicant's devices is shown hooked up in a side by side arrangement and these are mirror images of one another. Identical parts are indicated by the same reference characters.

Referring to the figures generally and with reference to either one of the devices shown, applicant's device is here illustrated in a preferred embodiment comprising a pair of wheels 10 which are mirror images of one another and are here shown in the form of frusto conical drums in axial spaced relation having relative to one another remote ground engaging rim portions 11 and adjacent tapered portions 12. Said rims may be variously formed for ground engaging purposes. Said drums have integral therewith interior hubs 13 each equipped with a set screw 14. Disposed through said hubs is a shaft 16 to be engaged by said set screws to movably position said drums. Said shaft is of a length to extend beyond each of said drums. Said drums preferably will be formed of material having substantial weight.

Carried between said drums to be rotatable therewith is a cylindrical member 20 having a cross sectional dimension less than that of the diameters of said outer rim portions 11. Said member 20 may be variously formed, such as of perforate or imperforate sheet material having a smooth or raised surface. In the present embodiment said cylindrical member is shown in the form of an endless belt of interlocking rod-like links 21. Said links may be of the kind commonly used to make up endless belts, as in potato harvesters. Said member 20 will be held in operating position by frictional engagement, and as is obvious from FIG. 1, said member will be self centering. The cross sectional dimension of said member 20, as is readily seen, will be determined by the length of the links or the number of links used.

Respectively mounted on said shaft 16 adjacent either end thereof are bearing blocks 23. Supported by said bearing blocks is a frame comprising a hollow horizontal frame member 26 substantially rectangular in cross section extending over said drums 11, and depending from either end portion thereof are vertical bar members 30 which will be secured to said bearing blocks at their lower end portions in any suitable manner, as by welding or the use of bolts. The pair of said members 26 are indicated as having a bar 27 rectangular in cross section extending therethrough and extending outwardly of either end thereof and having the set screws 28 as shown threaded through said frame members 26 to engage said rod 27. The members 26 are in axial spaced relation.

Extending forwardly of each frame member 26 is a windrower 32 comprising a pair of guides 34 formed of sheet material and indicated as being somewhat rectangular in plan and having a height to extend from just above ground level to substantially the height of said members 30. The rear vertical edge portions of said guides 34 respectively will be secured to the members 30 as by bolts 35. The forward and upper portions of said guides are somewhat reversely curved in the direction toward one another, as illustrated in FIGS. 1 and 2, to form shovel-like points 36 and inwardly turned deflecting portions 37 which will appear to be somewhat triangular in plan. The pointed portions 36 may be reenforced against wear if desired. As indicated in FIG. 1, the guides converge inwardly and in gathering in or engaging potato vines A, said guides tend to straighten out the vines into the line of travel of the device.

Angled along the outer sides of said guides 34 and secured thereto as by welding, and secured at one end each to the frame members 30 are reenforcing ribs 38.

Depending centrally from each of said members 26 is a plate member 40 and indicated as being riveted thereto are the adjacent end portions 42 of downwardly diverging bars 43 which partially underlie the curved portions 37 to be welded thereto whereby said windrower 32 is integral with the frame members 26 and 30 and rigid therewith.

Extending forwardly of each of said members 26 are stub plate members 48 having pivoted thereto by bolts 49 the rearwardly extended lug portions of rectangular collar brackets 51 equipped with set screws and extending through said brackets is a rectangular bar 50 having extending forwardly thereof and integral therewith a tongue or draw bar 52 equipped with a hitch 53 at its free end. Said draw bar is reinforced by angled braces 55 as indicated.

Upstanding centrally longitudinally of said bar 27, as by being welded thereto, is a plate bracket 54 and having a bifurcated portion pivoted thereto by a pin 56 is an elongated internally threaded socket 58 having an elongated crank 60 extending forwardly thereof and adapted to threadingly receive the adjacent threaded end portion 61 of said crank. Upstanding from said tongue is a supporting bar 63 having a bearing 64 at its upper end through which is journaled said crank 60 for free rotation therein but secured against longitudinal movement relative thereto. Said bar 63 is steadied by the angled stay member 65.

Disposed over the extended ends of the bar 27 at the remote end portions of said frame members 26 are elongated collars 67 equipped with set screws 68, and extending rearwardly of said collars 67 are elongated bars 69 having removably secured to the threaded free ends thereof members 70 forming counterbalance weights for applicant's device and positioned thereon by nuts 71.

Operation

In operation, the wheels 10 of the applicant's device will be formed of material having substantial weight so that in effect the device will serve as a clod crusher in being pulled over a row of potatoes. The cylindrical member 20 will normally be free of engagement with the ground in having a diameter less than the diameter of the ground engaging portions 11 of applicant's wheels. However in moving the device along a row of potatoes, the potato hills are of sufficient height to be engaged by the cylindrical member 20. With the rim portions 11 engaging the ground and the cylindrical portion 20 engaging the potato hills, the rim portions 11 of the wheels in view of their larger diameter will cover a greater linear distance for each rotation thereof than may be covered by each rotation of said cylindrical member 20. With the wheels moving forwardly covering a relatively greater linear distance than said cylindrical member 20, said member 20 is in effect dragged over the potato hills, and in passing over the crest of the hill it engages the potato vine thereon and has frictional engagement therewith to jerk the vine sufficiently in passing thereover to break the root system of the potatoes in the hill free from the potatoes. A jerk on the order of only a one-half inch is sufficient to secure this result.

The blade portions 37 in moving in advance of the wheels 10 align the potato vines in the direction of travel of the device.

The vines are straightened forwardly to be in regular rows. Normally the vines do not lie in any regular manner. As the cylindrical member 20 is engaging the base portions of the vines, the guide or blade portions 37 in straightening out the vines actually engage the vines sufficiently to in effect stretch them forwardly from their held base portions. Thus the vines are nicely windrowed. This results in a very much improved harvesting operation.

Applicant's device is preferably coupled in pairs drawn as by the tongue 52 as here illustrated.

In connection with his device, applicant provides means for determining the elevation of the guides 34 by use of the crank 60 and the socket 58. Thus as is obvious from the illustration, the crank may be rotated to change the angular relationship between the depending members 30 and the tongue 52 to tilt the blades 34 upwardly or downwardly in making a proper angular adjustment relative to the ground level.

Further the applicant shows the use of weights 70 extending rearwardly of the frame members 26 to act as a counter-balance for the blades 34 whereby the applicant provides a well balanced and a very easily operated device.

Applicant's device thus makes it possible to predetermine the maturity date of an entire field of potatoes which not only permits a convenient scheduling of work to be done in picking the potatoes but further permits control of the size of the potatoes by causing them to become matured at any desired predetermined time. This makes possible a field of potatoes having susbtantially uniform size which improves the marketability of a field of potatoes. The applicant's device has proved to be very successful in practice.

It will of course be understood that various changes may be made in the form, details, arrangement and proportions of the parts, without departing from the scope of applicant's invention which, generally stated, consists in an apparatus capable of carrying out the objects above set forth, in the parts and combinations of parts disclosed and defined in the appended claim.

What is claimed is:

A potato vine jerking device having in combination,
a pair of spaced frusto conical drums having adjacent tapered portions and remote ground engaging portions relative to one another,
said drums having interior recessed hub portions,
a shaft disposed through said hub portions, and
an endless chain of parallel elongated links disposed between said drums and frictionally engaged therewith, said chain being axially aligned with said drums and having a diameter less than the diameters of said ground engaging portions of said drums.

References Cited by the Examiner

UNITED STATES PATENTS

| 323,266 | 7/85 | Bradley | 172—552 |
|---|---|---|---|
| 1,199,704 | 9/16 | Kendall | 171—18 |
| 1,221,974 | 4/17 | Crowson | 171—112 |
| 1,761,286 | 6/30 | Zuckerman | 56—121.4 |
| 2,345,241 | 3/44 | Coyle | 171—4 |
| 2,544,024 | 3/51 | Johnson | 171—4 |
| 2,687,683 | 8/54 | Chattin | 172—552 |

T. GRAHAM CRAVER, *Primary Examiner.*

ANTONIO F. GUIDA, *Examiner.*